United States Patent
Akahane

(10) Patent No.: US 11,064,114 B2
(45) Date of Patent: Jul. 13, 2021

(54) IMAGE PROCESSING APPARATUS AND IMAGE PROCESSING METHOD FOR CORRECTING DETERIORATION IN IMAGE QUALITY DUE TO CHARACTERISTICS OF IMAGE OPTICAL SYSTEM

(71) Applicant: CANON KABUSHIKI KAISHA, Tokyo (JP)

(72) Inventor: Takashi Akahane, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/362,505

(22) Filed: Mar. 22, 2019

(65) Prior Publication Data

US 2019/0306416 A1    Oct. 3, 2019

(30) Foreign Application Priority Data

Mar. 28, 2018    (JP) .............................. JP2018-062074

(51) Int. Cl.
  *H04N 5/232* (2006.01)
  *G02B 7/14* (2021.01)
  *G06T 5/00* (2006.01)
  *H04N 9/64* (2006.01)
  *G06F 9/30* (2018.01)

(52) U.S. Cl.
  CPC ........... *H04N 5/23229* (2013.01); *G02B 7/14* (2013.01); *G06F 9/3004* (2013.01); *G06T 5/001* (2013.01); *H04N 9/646* (2013.01)

(58) Field of Classification Search
  None
  See application file for complete search history.

(56) References Cited

U.S. PATENT DOCUMENTS

| | | | |
|---|---|---|---|
| 6,670,988 B1 * | 12/2003 | Gallagher | H04N 1/401 348/224.1 |
| 8,593,548 B2 * | 11/2013 | Sun | H04N 9/045 348/251 |
| 2011/0298933 A1 * | 12/2011 | Yanowitz | H04N 5/367 348/175 |
| 2012/0081594 A1 * | 4/2012 | Makigaki | H04N 5/23209 348/340 |

FOREIGN PATENT DOCUMENTS

| JP | 2000-3437 A | 1/2000 |
|---|---|---|
| JP | 2003-110936 A | 4/2003 |
| JP | 2006-121384 A | 5/2006 |

\* cited by examiner

*Primary Examiner* — James M Hannett
(74) *Attorney, Agent, or Firm* — Canon U.S.A., Inc. IP Division

(57) ABSTRACT

An image processing apparatus capable of achieving an excellent image quality while obtaining an effect of correction and suppressing side effects caused by correction processing is provided. This image processing apparatus sets a correction value for correcting a deterioration in an image quality due to characteristics of an image optical system, based on lens characteristic information about the image optical system, and performs image processing using the correction value on an image. In an area corresponding to a range where incident light having passed through the image optical system does not reach, a limit to a level for the correction value is set.

9 Claims, 8 Drawing Sheets

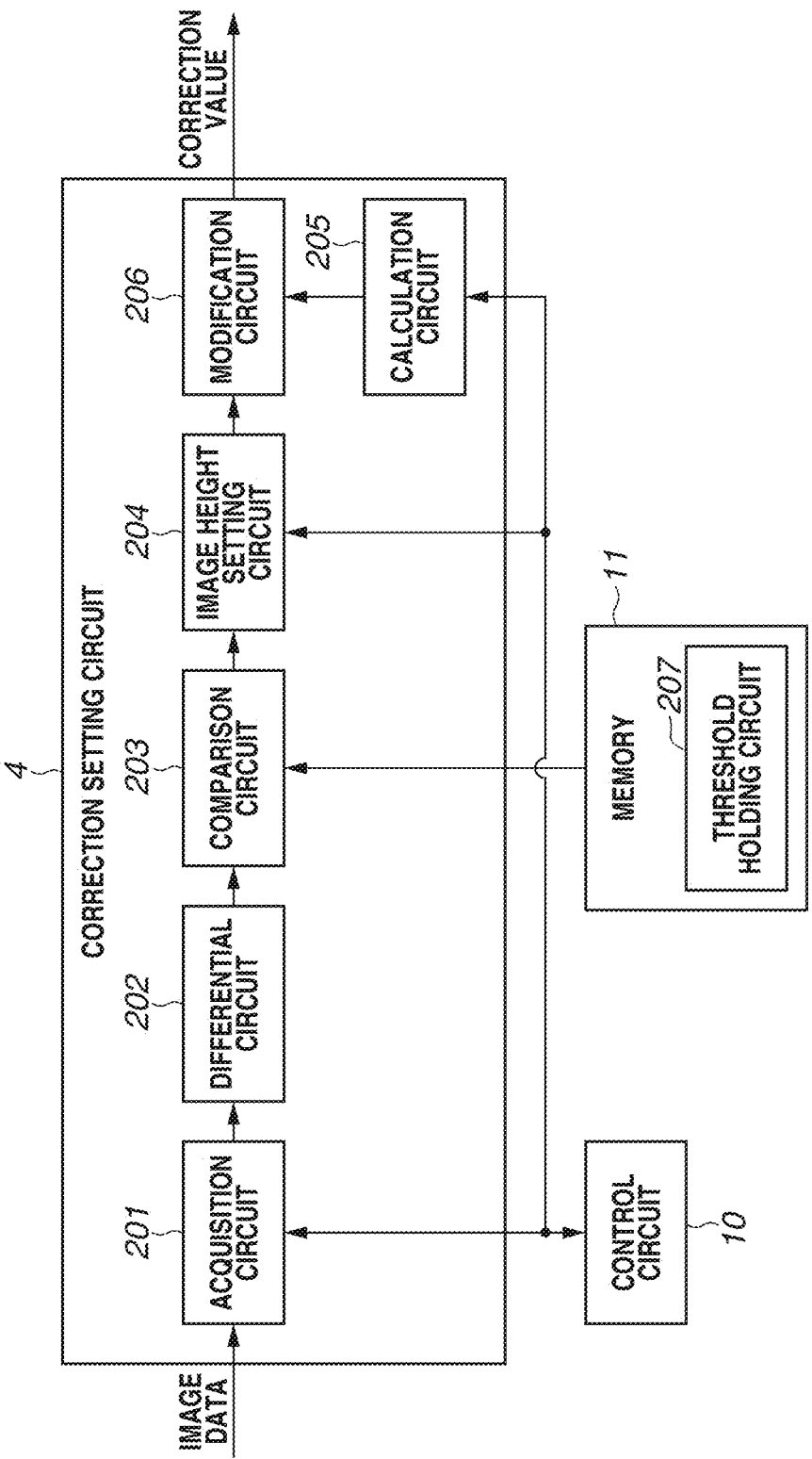

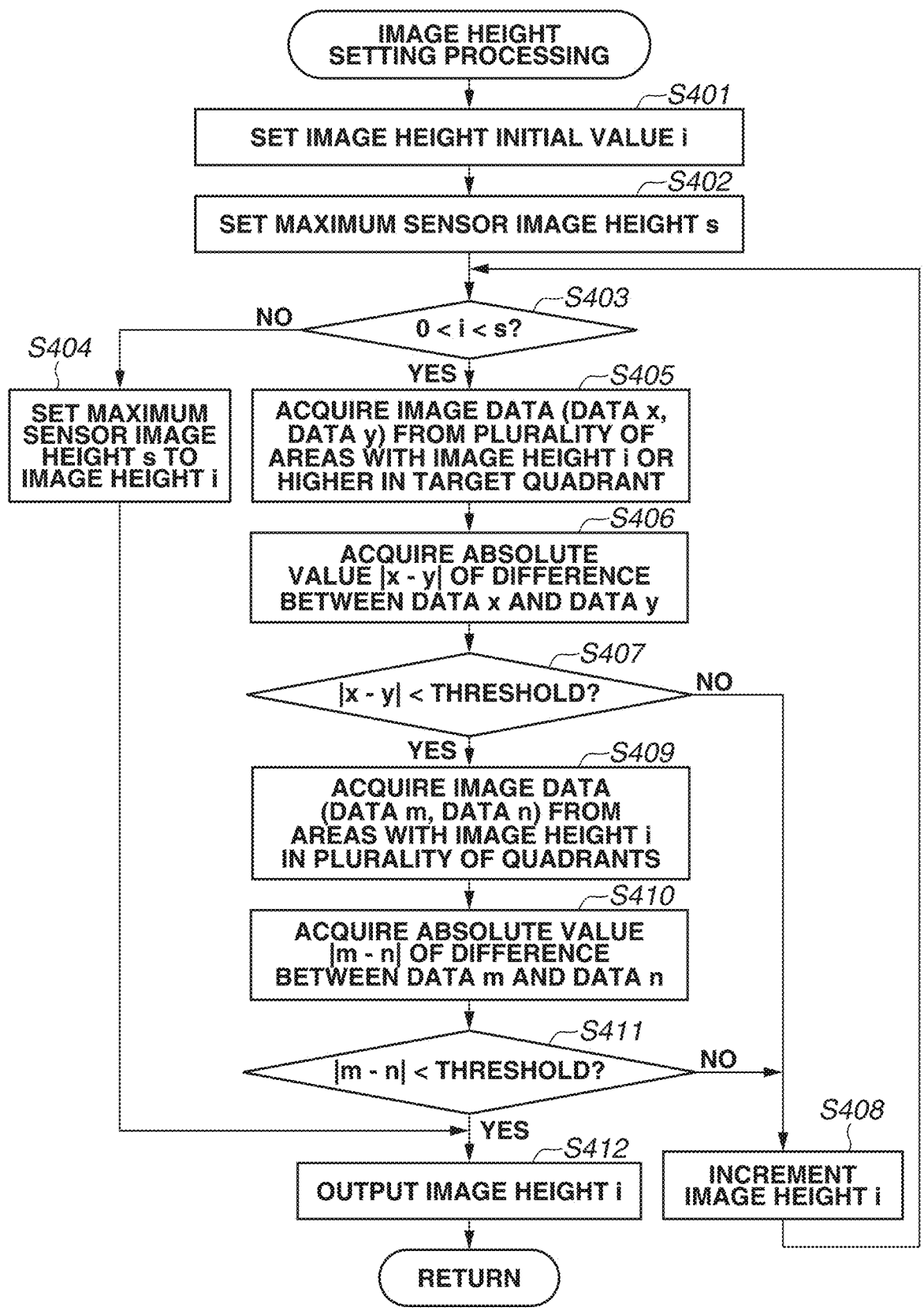

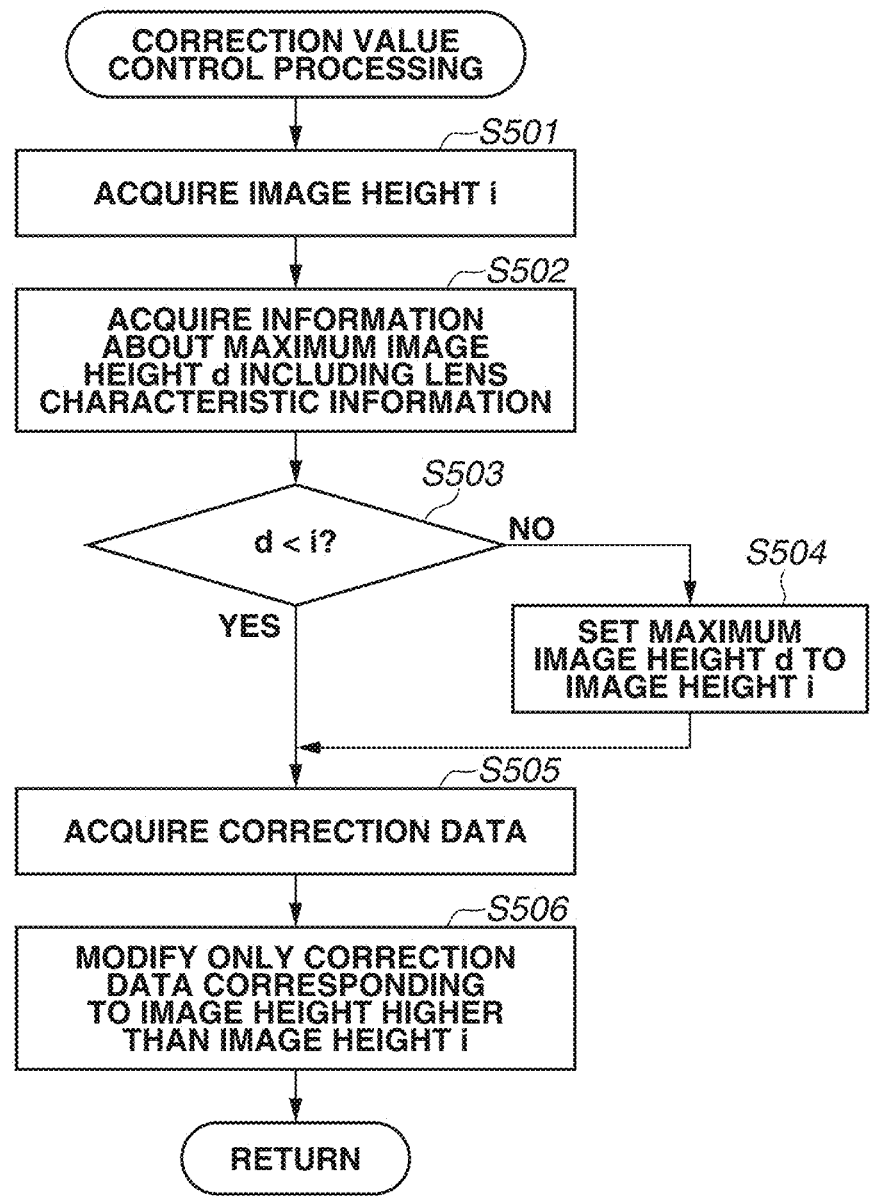

IMAGE PROCESSING APPARATUS AND IMAGE PROCESSING METHOD FOR CORRECTING DETERIORATION IN IMAGE QUALITY DUE TO CHARACTERISTICS OF IMAGE OPTICAL SYSTEM

BACKGROUND OF THE INVENTION

Field of the Invention

One disclosed aspect of the embodiments relates to an image processing technique for processing an image captured via an optical system.

Description of the Related Art

A lens unit for forming an object image on an image sensor has various inherent factors which cause a deterioration in an image quality, such as distortion, blur, or a drop in peripheral illumination, on the object image. For example, a magnification chromatic aberration due to which the peripheral color of an image is blurred is caused when red, green, and blue lights having passed through the lens unit are focused at different positions in a direction orthogonal to an optical axis due to the different wavelengths of the respective color lights. A drop in peripheral illumination as a phenomenon in which the quantity of light decreases toward an end of an image than in the central portion of the image is caused by so-called vignetting, which is caused when part of the peripheral light is blocked by a barrel or the like of the lens unit, the cosine fourth law, or the like. For example, the magnification chromatic aberration as one of the examples of the deterioration in the image quality due to the lens unit can be reduced to some extent by using a combination of a plurality of lenses having complicated shapes or by using fluorite with less chromatic dispersion as a lens material. A drop in peripheral illumination can also be reduced to some extent by using, for example, a lens having an image circle larger than the designed size of an image sensor. However, in either of the above-described cases, it is difficult to completely prevent the deterioration in the image quality.

Various lens optical correction techniques have been discussed for reducing the deterioration in the image quality due to characteristics of the lens unit by performing image correction processing using signal processing. For example, to reduce a drop in peripheral illumination, Japanese Patent Application Laid-Open No. 2003-110936 discusses a technique in which correction data about a drop in peripheral illumination obtained based on the aperture, focal length, and shooting distance of a lens unit is stored in a read-only memory (ROM) and correction processing is performed using the correction data obtained based on the actual aperture value, focal length, shooting distance, and the like. Further, for example, Japanese Patent Application Laid-Open No. 2000-3437 discusses a technique for correcting a deterioration in an image quality due to an aberration of a lens based on aberration information about a lens unit, brightness data on an object, and color difference data. Furthermore, for example, Japanese Patent Application Laid-Open No. 2006-121384 discusses a technique in which correction values corresponding to a current zoom position, an aperture value, and a focus position, are obtained from discrete correction values by interpolation, instead of storing correction values for correcting a drop in peripheral illumination for each of a zoom position, an aperture value, and a focus position.

In some lenses, an area where no light reaches and an object image or the like is not formed may be present at an image height higher than a certain image height on an imaging plane of an image sensor. In the area where no light reaches and an object image or the like is not formed, the image cannot be corrected even if the above-described correction processing is carried out. In addition, a larger correction value is generally used for an area at a higher image height in the correction processing. Accordingly, in the area at a high image height where no light reaches and an object image or the like is not formed, an image quality is deteriorated due to side effects such as an increase in noise caused by correction processing using a large correction value. To prevent the deterioration in the image quality, the correction value may be clipped using a predetermined value, for example. In this case, however, the effect of correction on an area where light reaches and an object image or the like is formed is also reduced.

SUMMARY OF THE INVENTION

One disclosed aspect of the embodiments is directed to providing an image processing apparatus capable of performing correction processing for obtaining an image with an excellent image quality and an image processing method thereof.

According to an aspect of the embodiments, an image processing apparatus includes circuitry configured to set a correction value for correcting a deterioration in an image quality due to characteristics of an image optical system, based on characteristic information about the image optical system, and to perform image processing using the correction value on an image captured by the image optical system. A degree of the deterioration in the image quality due to the characteristics of the image optical system changes in a manner corresponding to an image height. (i) An average of change ratios in the correction value to a change in the image height in a first area is smaller than an average of change ratios in the correction value to a change in the image height in a second area, or (ii) the correction value in the first area is constant and the correction value in the second area changes in a manner corresponding to the image height, and wherein the first area is an area corresponding to a range where incident light having passed through the image optical system does not reach, and the second area is an area corresponding to a range where the incident light having passed through the image optical system reaches.

Further features of the disclosure will become apparent from the following description of exemplary embodiments with reference to the attached drawings.

BRIEF DESCRIPTION OF THE DRAWINGS

FIG. 2 is a block diagram illustrating a schematic configuration of a correction setting circuit according to the present exemplary embodiment.

FIGS. 4B and 4C are flowcharts each illustrating a detailed processing procedure of the lens optical correction processing.

DESCRIPTION OF THE EMBODIMENTS

Preferred exemplary embodiments of the disclosure will be described in detail below with reference to the accompanying drawings.

According to an exemplary embodiment, an apparatus including an image capturing system, such as a digital camera or a scanner, is illustrated as an application example of an image processing apparatus. However, the image processing apparatus according to the present exemplary embodiment is not particularly limited to these examples, as long as the apparatus can process image data. Specifically, the image processing apparatus according to the present exemplary embodiment may be an information processing apparatus, such as a personal computer which processes a captured image, a mobile information terminal, an image forming apparatus, such as a printer, or the like.

Figure 1:
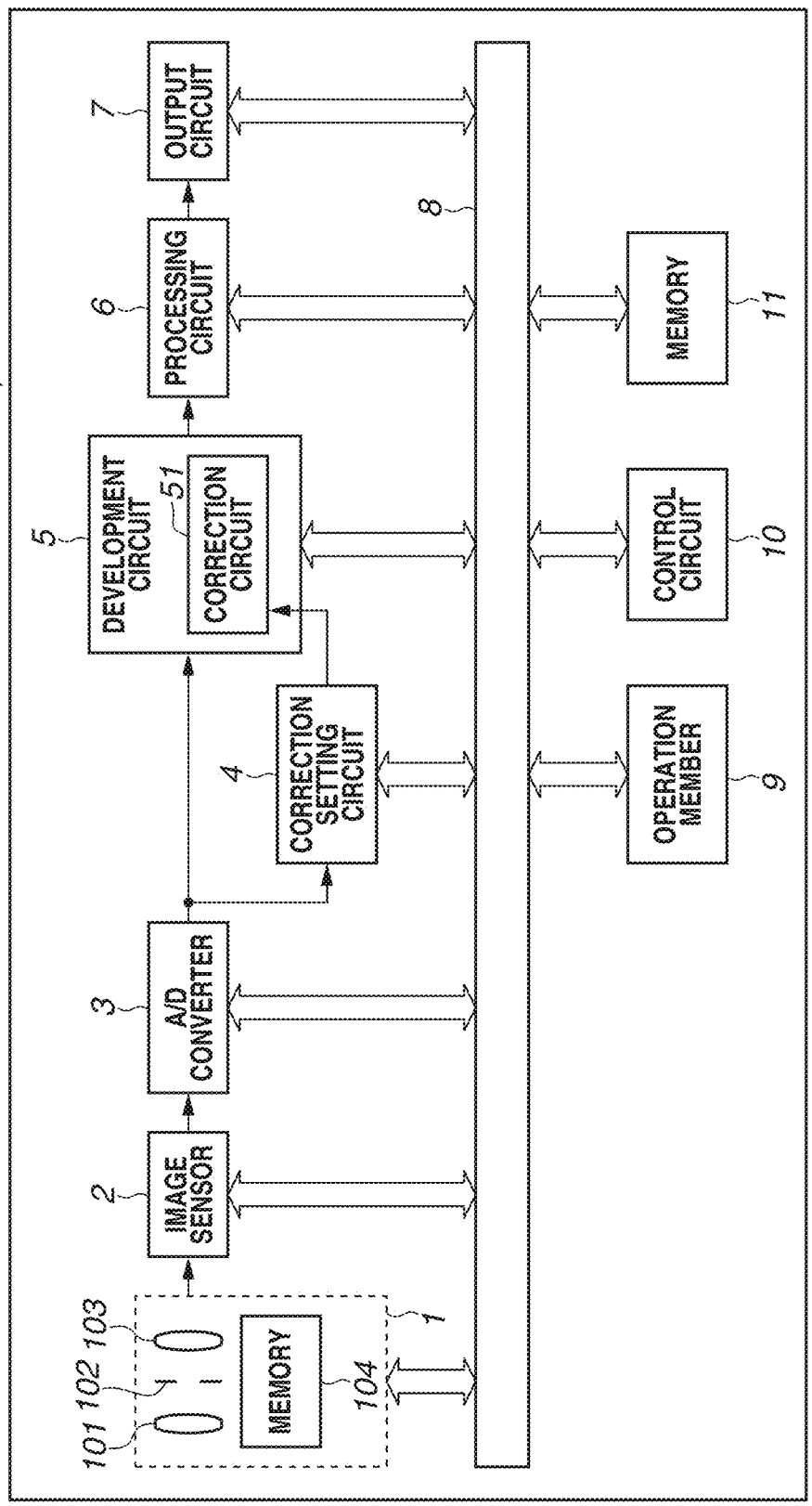
FIG. 1 is a block diagram illustrating a schematic configuration of a digital camera as an application example of an image processing apparatus according to an exemplary embodiment.

FIG. 1 is a block diagram illustrating a schematic configuration of a digital camera (hereinafter referred to as a camera 100) as an application example of the image processing apparatus according to the present exemplary embodiment.

In the camera 100, a lens unit 1 includes an image optical system including, for example, a focus lens 101, an aperture 102, and a zoom lens 103, and forms an optical image of an object (not illustrated) on an imaging plane of an image sensor 2. A position of the focus lens 101 is controlled by an autofocus (AF) mechanism and a manual focus mechanism, which are not illustrated, to perform focus adjustment for a distance from the object. The aperture diameter of the aperture 102 is controlled as an image capturing condition setting for an F-number. The position of the zoom lens 103 is controlled by a manual zoom mechanism (not illustrated) for adjusting the image magnification of the object.

The lens unit 1 also includes a memory 104. The memory 104 stores lens characteristic information unique to the lens unit 1, such as a lens identification (ID) as identification information about the lens unit 1, the focal length, open F-number, and an image circle size, and correction data which is used to correct a deterioration in an image quality due to lens optical characteristics. According to the present exemplary embodiment, as described in detail below, the correction data stored in the memory 104 is data corresponding to a range of image heights less than or equal to an image height of a designed image circle of the lens unit 1.

The correction data included in the lens characteristic information includes correction values to be used in signal processing to correct various deteriorations in the image quality caused by the lens unit 1, such as a decrease in marginal illumination, diffraction, chromatic aberration, shading, spherical aberration, and distorted aberration, and correction values or the like for image restoration processing. For example, data to be used to correct a drop in peripheral illumination, which causes decrease in the quantity of light toward an end of an image than in the central portion of the image, includes information indicating a correspondence relationship between incident light quantity data and image heights at each focal length and each aperture value of the lens unit 1. Further, for example, the correction data for image restoration processing includes a correction value for correcting a deterioration in an image quality, which is caused in a captured image due to the aberration or diffraction phenomenon in the optical system of the lens unit 1, by using an image restoration filter having a correction characteristic calculated from an optical transfer function (OTF) of the optical system. In the image restoration processing, for example, a method of performing convolution processing on input image by using an image restoration filter having an inverse characteristic of the OTF of the image optical system is used. The image restoration processing using the image restoration filter generally includes processing for restoring the sharpness of an image by emphasizing each frequency component included in a captured image, and processing for correcting aberrations associated with color components, such as an axial chromatic aberration or color comatic aberration, in the image optical system. The correction data included in these pieces of lens characteristic information is obtained in advance. The correction data for correcting diffraction, chromatic aberration, shading, spherical aberration, distorted aberration, and the like is also obtained in advance. These pieces of correction data may be data corresponding to the entire range of image heights less than or equal to the image height of the image circle of the lens unit 1, or may be discrete data for reducing the amount of recording data stored in the memory 104.

The image sensor 2 is, for example, a single-chip color image sensor including general primary color filters. The primary color filters include three types of color filters, i.e., a red (R) filter having a main transmission wavelength band around 650 nm, a green (G) filter having a main transmission wavelength band around 550 nm, and a blue (B) filter having a main transmission wavelength band around 450 nm. In the single-chip color image sensor, the color filters are spatially arrayed in a mosaic pattern for each pixel, and a signal intensity in a single color is obtained from each pixel. Thus, a color mosaic image is output from the image sensor 2. An analog image signal obtained from the image sensor 2 is sent to an analog-to-digital (A/D) converter 3.

The A/D converter 3 converts the analog image signal from the image sensor 2 into a digital image signal (image data). According to the present exemplary embodiment, in this processing, for example, 12-bit image data is generated for each pixel. The image data obtained by the digital conversion performed by the A/D converter 3 is sent to each of a development circuit 5 and a correction setting circuit 4. Among others, the development circuit 5 and the correction setting circuit 4 form the circuitry configured to set a correction value for correcting a deterioration in an image quality, and to perform image processing using the correction value.

The correction setting circuit 4 sets correction values for correction processing according to lens optical characteristics based on the lens characteristic information acquired from the memory 104 and information indicating a current state of the lens unit 1 (hereinafter referred to as lens state information). The correction values set by the correction setting circuit 4 are various correction values, including correction values for correcting a deterioration in an image quality due to a drop in peripheral illumination, a diffraction phenomenon, and a chromatic aberration, and a filter coefficient of the image restoration filter. These correction values are stored in a memory 11. As described in detail below, in the case of setting the correction values, the correction setting circuit 4 obtains an image height in an area outside the image circle where no light reaches, based on the image data from the A/D converter 3, and also sets a correction value for an area within an image height range outside the image circle. According to the present exemplary embodiment, the operation and detailed configuration for setting the correction values by the correction setting circuit 4 will be described below.

The development circuit 5 divides R, G, B image data into color planes corresponding to R, G, and B bands, respectively, and performs a series of development processing, such as pixel interpolation processing, correction processing according to lens optical characteristics, brightness signal processing, and color signal processing. In the series of development processing, in particular, the correction processing according to lens optical characteristics is performed by a correction circuit 51. The correction circuit 51 acquires the correction values set by the correction setting circuit 4, and performs correction processing by signal processing for correcting the deterioration in the image quality caused by the lens optical characteristics, by using the correction values. The correction processing in the correction circuit 51 will be described in detail below. By the development processing in the development circuit 5, R, G, and B color spaces are converted into color spaces for 8-bit brightness (Y) data and color difference (Y, V) data, and the YUV data is sent to a processing circuit 6.

The processing circuit 6 performs resize processing or the like on the image data on which the series of development processing by the development circuit 5 have been performed, and supplies the result image data to an output circuit 7.

The output circuit 7 performs at least one of processes of outputting data to an output interface such as High-Definition Multimedia Interface (HDMI)®, recording data on a recording medium such as a semiconductor memory card, and outputting data to a display device (not illustrated) of the camera 100.

An operation member 9 includes one or more input devices such as a switch, a button, and a touch panel provided on the display device (not illustrated). An operation input from an outside, such as an instruction issued by a user, is input to a control circuit 10 of the camera 100 via the operation member 9. In response to the operation, the control circuit 10 performs arithmetic processing and controls each unit.

The control circuit 10 controls each unit through a bus 8 and performs necessary arithmetic processing as needed.

The memory 11 stores image data which is used in each processing circuit and data on information at image capturing, such as an aperture value, a shutter speed, an International Organization for Standardization (ISO) sensitivity, a white balance gain value, a setting of a color gamut, such as standard RGB (s-RGB), and the correction values described above. The data stored in the memory 11 is read out, as needed, and used in response to an instruction from the control circuit 10.

The bus 8 connects the components illustrated in FIG. 1 in such a manner that the components communicate with each other.

Correction value setting processing that is performed by the correction setting circuit 4 and correction processing which is performed by the correction circuit 51 using the set correction values will be described in detail below.

According to the present exemplary embodiment, assume that the lens unit 1 is, for example, a lens unit compatible with Advanced Photo System type-C (APS-C) (hereinafter referred to as an APS-C lens) which is designed to be compatible with a so-called APS-C size image sensor. In the APS-C lens, an image circle (effective image circle) optimized with an optical performance (a light quantity, an aberration performance, etc.) is set to the APS-C size image sensor, and the radius of the image circle is about 13.4 mm. Accordingly, the memory 104 of the lens unit 1 stores the lens characteristic information corresponding to the range of image heights less than or equal to the image height of the image circle of the APS-C lens. Specifically, the memory 104 stores the lens characteristic information corresponding to the range of image heights from 0 mm to 13.4 mm, and does not store lens characteristic information corresponding to an area exceeding the image height of 13.4 mm, and thus lens characteristic information corresponding to an area exceeding the image height of 13.4 mm is not present in the memory 104. According to the present exemplary embodiment, the lens unit 1 is an interchangeable lens that is interchangeable with respect to a camera body.

According to the present exemplary embodiment, the image sensor 2 is, for example, a so-called 35 mm full-size image sensor (hereinafter referred to as a 35 mm full-size sensor), and the size of the imaging plane of the image sensor 2 is about 36.0×24.0 mm. In other words, the camera 100 according to the present exemplary embodiment is a lens-interchangeable camera including a 35 mm full-size sensor (hereinafter referred to as a 35 mm full-size camera). In the present exemplary embodiment, a description will be given of a case where the lens unit 1 (APS-C lens) designed to be compatible with the APS-C size image sensor is mounted on the 35 mm full-size camera.

According to the present exemplary embodiment, in a case where the APS-C lens is mounted on the 35 mm full-size camera, an object image or the like formed using the APS-C lens is captured by the image sensor 2 which is a 35 mm full-size sensor. The object image or the like formed by the lens unit 1 may be present not only on the inside of the image circle corresponding to the designed APS-C size, but also on the outside of the image circle. Accordingly, when an image is captured by the 35 mm full-size sensor, the object image or the like formed on the outside of the image circle can also be captured.

The lens characteristic information stored in the memory 104 of the lens unit 1 is however information corresponding to the range of image heights less than or equal to the image height of the image circle of the APS-C lens as described above, and thus information corresponding to an area outside the image circle is not present in the memory 104. Accordingly, also for the correction data which is used for correction processing according to lens optical characteristics, the correction value corresponding to the area outside the image circle is not present. In this case, to perform correction processing on the area outside the image circle, it is necessary to separately generate the correction value corresponding to the area outside the image circle. The correction value corresponding to the area outside the image circle can be generated by, for example, performing interpolation processing or the like on the correction value in an image height direction outside the image circle based on the correction data within the image circle stored in the memory 104.

However, in many cases, an area at a higher image height on the outside of the image circle of the APS-C lens on the imaging plane of the 35 mm full-size sensor is an area where light from a lens does not reach and an object image or the like is not formed. In the area where no light reaches and an object image or the like is not formed, even if correction processing using the correction values generated by interpolation processing or the like is performed, correction may be ineffective. As another example, if the correction value corresponding to the area outside the image circle is generated by performing interpolation processing on the correction value corresponding to the area within the image circle in the image height direction, a larger correction value may be generated for a higher image height. If correction processing using such a large correction value is performed on the area where no light reaches and an object image or the like is not formed, the image quality may be deteriorated due to side effects such as an increase in noise caused by the correction processing using the large correction value.

According to the present exemplary embodiment, in the case of generating a correction value to be applied to the area outside the image circle, the correction setting circuit 4 obtains an image height in an area outside the image circle where no light reaches, and sets an area at an image height or higher where no light reaches (hereinafter referred to as a light-free area). A method for setting the image height where no light reaches will be described below. Further, the correction setting circuit 4 sets the correction value with which correction processing can be performed without side effects, such as an increase in noise, on the light-free area. Then, the correction circuit 51 performs correction processing on the image data using the correction value set by the correction setting circuit 4. With this configuration, the camera 100 according to the present exemplary embodiment can obtain image data in which side effects of correction processing on the light-free area where no light reaches are suppressed, while obtaining the effect of correction on the area where light reaches.

<Example of Correction Value Setting Processing for Correcting a Drop in Peripheral Illumination>

FIG. 2 is a block diagram illustrating a detailed configuration of the correction setting circuit 4 according to the present exemplary embodiment. In FIG. 2, the control circuit 10 and the memory 11 which are illustrated in FIG. 1 are also included.

While the correction setting circuit 4 sets various correction values to be used for correcting a drop in peripheral illumination, a diffraction phenomenon, a chromatic aberration, and the like, as correction values for correction processing according to lens optical characteristics, a case where the correction value for correcting a drop in peripheral illumination will be described as an example.

Referring to FIG. 2, the control circuit 10 reads lens characteristic information from the memory 104 of the lens unit 1 when a power supply of the camera 100 according to the present exemplary embodiment is turned on, or when the interchangeable lens (lens unit 1) is connected. The lens characteristic information read in this processing includes a lens ID of the lens unit 1, at least focal lengths at a wide-angle end and a telephoto end of a lens, an open F-number, an image circle size, and correction data corresponding to the image height range within the image circle.

Further, the control circuit 10 acquires lens state information indicating the current state of the lens unit 1 at each predetermined timing, e.g., every time a still image is captured, or for each frame of a moving image. Specifically, the control circuit 10 acquires information about, for example, a current aperture value, a current focal length (zoom position), and a current focus position, as the lens state information. These pieces of information are examples. The control circuit 10 can also acquire, as needed, information other than these pieces of information, such as information indicating the state or the like of each lens that can be used for image correction. Then, the control circuit 10 notifies an image height setting circuit 204 and a calculation circuit 205 of the lens characteristic information together with the acquired lens state information.

The calculation circuit 205 calculates the correction value for correcting a drop in peripheral illumination based on the lens characteristic information and the lens state information notified from the control circuit 10. The correction value that is used in this processing may be stored correction values preliminarily calculated based on the lens characteristic information and the lens state information, or an approximated value obtained by a general optical formula based on the lens state information and the lens characteristic information.

According to the present exemplary embodiment, the correction value for correcting a drop in peripheral illumination is calculated by the correction setting circuit 4 using the incident light quantity data as the lens characteristic information.

FIGS. 3A to 3D illustrate a relationship between the incident light quantity data about a case in which the lens unit 1 is set to a wide-angle side focal length with an aperture wide open and the correction value corresponding to the incident light quantity data.

Figure 3A:
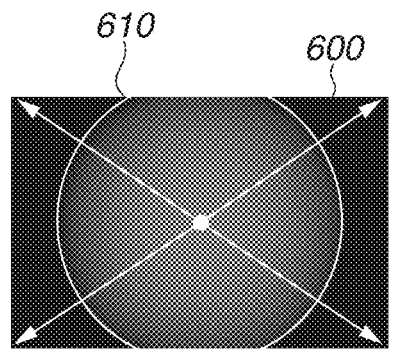
FIG. 3A is a diagram illustrating an example of an image indicating a drop in peripheral illumination.

FIG. 3A is a diagram illustrating an example of a captured image 600. According to the present exemplary embodiment, the captured image 600 is an image captured by the image sensor 2 in a state where the lens unit 1 is set to the wide-angle side focal length with the aperture wide open while the image sensor 2 is a 35 mm full-size sensor and the lens unit 1 is an APS-C lens. The captured image 600 illustrated in FIG. 3A is an example of an image captured, for example, in such a manner that an image of an object with a uniform brightness is displayed on the entire screen while the lens unit 1 is set to the wide-angle side focal length with the aperture wide open. In FIG. 3A, a virtual circle representing an image circle 610 of the lens unit 1 and virtual straight lines extending in a diagonal direction from an optical axis (screen center) are also included. The captured image 600 of the object with a uniform brightness is illustrated by way of example in the present exemplary embodiment. However, the captured image 600 is an example illustrated to facilitate the description of the lens characteristics of the lens unit 1 with respect to the quantity of incident light, and the image of the object to be captured is not limited to one with a uniform brightness.

According to the present exemplary embodiment, the incident light quantity data on the lens characteristic information stored in the memory 104 includes only the data corresponding to the area in the image height range of about 13.4 mm, which corresponds to the radius of the image circle of the APS-C lens, as described above. On the other hand, the size of the imaging plane of the image sensor 2, which is a 35 mm full-size sensor, is about 36.0×2.0 mm, as described above, and a maximum image height from the center of the image sensor 2 (a maximum image height in the diagonal direction from the center of the sensor; hereinafter referred to as a maximum sensor image height) is about 21.6 mm Consequently, according to the present exemplary embodiment, the calculation circuit 205 separately generates data (currently not present) corresponding to the area outside the image circle. For example, the calculation circuit 205 obtains the incident light quantity data corresponding to the area outside the image circle by interpolation processing based on an inclination indicated by the incident light quantity data within the image circle, and also generates the correction value for correcting a drop in peripheral illumination in the area outside the image circle based on the incident light quantity data corresponding to the area outside the image circle.

Figure 3B:
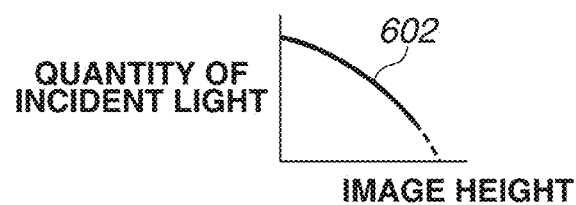
FIGS. 3B, 3C, and 3D are graphs each illustrating a correction value for correcting a drop in peripheral illumination.
Figure 3C:
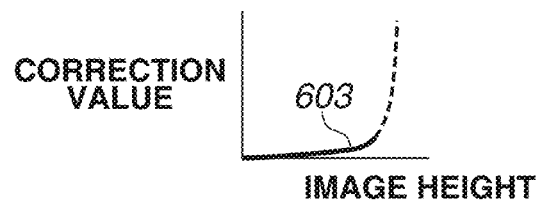

FIG. 3B is a graph illustrating a correspondence relationship between the image height and the quantity of incident light while the lens unit 1 is set to the wide-angle side focal length with the aperture wide open. In FIG. 3B, a portion indicated by a solid line in incident light quantity data 602 represents the quantity of incident light at each image height in the image height range within the image circle, and a portion indicated by a dotted line represents the quantity of incident light at each image height in the area outside the image circle generated by interpolation processing. FIG. 3C is a graph indicating a correspondence relationship between each image height and the correction value for correcting a drop in peripheral illumination in a case where the lens unit 1 is set to the wide-angle side focal length with the aperture wide open. In FIG. 3C, a portion indicated by a solid line in correction data 603 represents the correction values each corresponding to a different one of the image heights in the image height range within the image circle, and a portion indicated by a dotted line represents the correction value for correcting a drop in peripheral illumination generated based on the quantity of incident light in the area outside the image circle. The correction value for correcting a drop in peripheral illumination is a correction value compensating for a drop in the quantity of incident light. As indicated by the correction data 603 illustrated in FIG. 3C, in the area in which the quantity of incident light drop, like in the area outside the image circle, a large value is set as the correction value for correcting a drop in peripheral illumination. In particular, in the area at the image height or higher (e.g., an image height of 16 mm or higher) where the value of the incident light quantity data 602 illustrated in FIG. 3B is zero, the correction value for correcting a drop in peripheral illumination becomes extremely large. Further, if correction processing using a large correction value is performed on the light-free area at the image height or higher where the quantity of incident light is zero, side effects may occur as described above. The light-free area is an area in which correction by correction processing is ineffective.

Thus, according to the present exemplary embodiment, the correction setting circuit 4 sets the light-free area in which the quantity of incident light is zero, and sets the correction value obtained in such a manner that an average change ratio corresponding to the image height of the correction value in the light-free area becomes smaller than the average change ratio corresponding to the image height of the correction value within the image circle.

To implement the correction value setting processing, the correction setting circuit 4 includes an acquisition circuit 201, a differential circuit 202, a comparison circuit 203, an image height setting circuit 204, and a modification circuit 206, as illustrated in FIG. 2, in addition to the calculation circuit 205 described above. Specifically, in the correction setting circuit 4, the incident light quantity data at each image height in the area outside the image circle is acquired based on the captured image data obtained by the image sensor 2, which is a 35 mm full-size sensor, and modifies the correction value corresponding to the image height in the light-free area based on the incident light quantity data at each image height in the area outside the image circle.

The acquisition circuit 201 acquires image data from the A/D converter 3 and receives, for example, pieces of area information from the control circuit 10. The pieces of area information indicates an image height area for each predetermined image height width in order in the image height direction. The predetermined image height width may be a width corresponding to one pixel, or may be a width corresponding to a plurality of pixels. The acquisition circuit 201 acquires, for example, G pixel values, from the image data for each image height area of the predetermined image height width in order in the image height direction, as indicated by the area information supplied from the control circuit 10. According to the present exemplary embodiment, two pieces of area information are supplied at one time from the control circuit 10. Thus, the acquisition circuit 201 acquires the pixel values in two image height areas corresponding to the two pieces of area information, respectively, and outputs a pair of pixel values corresponding to the two image height areas to the differential circuit 202. In a case where the predetermined image height width corresponds to a width of a plurality pixels, the acquisition circuit 201 obtains average values of the plurality of pixel values for each of the two pieces of area information set in the control circuit 10, and outputs a pair of the obtained average values to the differential circuit 202.

The differential circuit 202 obtains the absolute value of a difference between the pair of values sent from the acquisition circuit 201, and outputs the obtained absolute value to the comparison circuit 203.

The comparison circuit 203 reads out a threshold prepared in advance in a threshold holding circuit 207 included in the memory 11, compares the threshold with the difference absolute value sent from the differential circuit 202, and outputs the comparison result to the image height setting circuit 204.

The image height setting circuit 204 sets the light-free area at the image height or higher in the area outside the image circle where no light reaches, based on the comparison result sent from the comparison circuit 203 and the lens characteristic information and lens state information sent from the lens unit 1, under control of the control circuit 10. Then, the image height setting circuit 204 outputs information indicating the image height corresponding to the set light-free area to the modification circuit 206.

As described above, the acquisition circuit 201 acquires image data, and the differential circuit 202 obtains the absolute value of a difference between pieces of the image data at each image height. Then, the comparison circuit 203 compares the difference absolute value with the threshold, and the image height setting circuit 204 sets the image height where the quantity of incident light is zero, based on the comparison result. More specifically, the image height setting circuit 204 sets, as a predetermined image height, an image height in a predetermined range in which the absolute value of the difference between the pieces of image data at each image height is less than the threshold. An area at an image height higher than or equal to the predetermined image height is set as the light-free area.

The modification circuit 206 modifies the correction value (i.e., the correction data 603 illustrated in FIG. 3C) received from the calculation circuit 205 based on information indicating the image height which is received from the image height setting circuit 204 and indicates the image height, i.e., information indicating the light-free area at the image height or higher where no light reaches. In this case, the modification circuit 206 obtains the average change ratio corresponding to the image height of the correction value in the image circle from, for example, the correction value calculated by the calculation circuit 205. Then, the modification circuit 206 modifies the correction value in the light-free area in such a manner that the average change ratio corresponding to the image height of the correction value in the light-free area outside the image circle becomes smaller than the average change ratio corresponding to the image height of the correction value in the image circle. The average change ratio corresponding to the image height of the correction value in the image circle may be obtained in advance. The correction value obtained by the modification processing performed by the modification circuit 206 as described above is sent to the correction circuit 51 illustrated in FIG. 1.

Figure 3D:
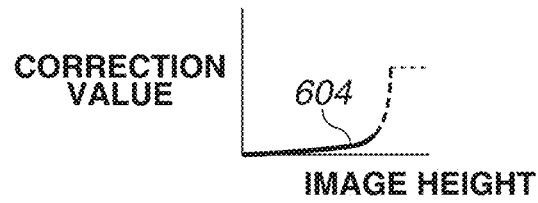

FIG. 3D is a diagram illustrating correction data 604 indicating the relationship between image heights and correction values for correcting a drop in peripheral illumination. The image heights and the correction values have been obtained by modifying the correction value (i.e., the correction data 603 illustrated in FIG. 3C) calculated by the calculation circuit 205 using the configuration from the acquisition circuit 201 to the modification circuit 206. In the correction data 604 illustrated in FIG. 3D, a portion indicated by a solid line represents the correction value in the image height range within the image circle, and a portion indicated by a dotted line represents the correction value which is generated based on the quantity of incident light in the area outside the image circle and, in terms of the light-free area, the correction value which is obtained by the further modification processing. In the correction data 604 illustrated in FIG. 3D, the correction value obtained by modification processing in the light-free area at the image height or higher where the value of the incident light quantity data is zero is set in such a manner that the average change ratio corresponding to the image height of the correction value becomes smaller than that in the area at an image height, which is lower than the above-described image height, where light reaches. In the example of FIG. 3D, the average change ratio of the correction value in the light-free area is reduced by modification processing in which the correction value in the light-free area at the image height or higher where the value of the incident light quantity data is zero is clipped using the correction value at the image height where the value of the incident light quantity data is zero. Thus, in a case where the correction processing using the correction data 604 illustrated in FIG. 3D is carried out, it is possible to obtain image data in which side effects of the correction processing on an area in the vicinity of the area where no light reaches are suppressed, while obtaining the effect of correction on the area where light reaches.

Figure 4A:
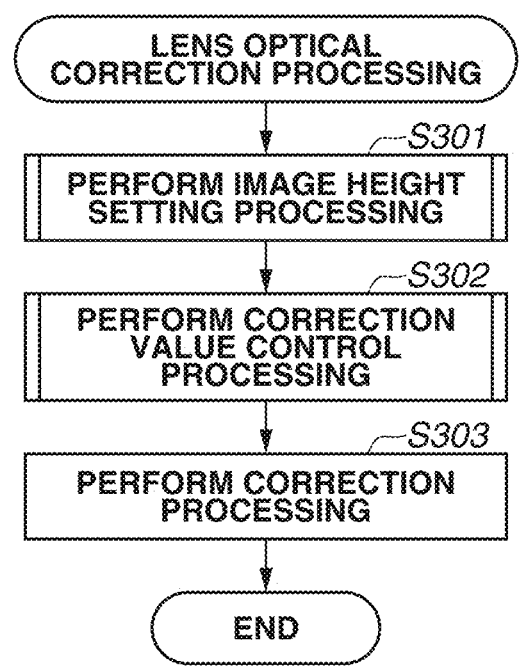
FIG. 4A is a flowchart illustrating an outline of lens optical correction processing.

FIG. 4A is a flowchart illustrating an overall processing flow of correction processing depending on lens optical characteristics to be performed by the camera 100 according to the present exemplary embodiment. The processing in the flowchart illustrated in FIG. 4A is executed by the control circuit 10 and by the correction setting circuit 4 and the correction circuit 51 under control of the control circuit 10.

The processing in the flowchart of FIG. 4A may be executed by a hardware configuration, or may be implemented by a software configuration based on a program to be executed by a central processing unit (CPU) or the like. Alternatively, a part of the processing may be implemented by a hardware configuration and the other part of the processing may be implemented by a software configuration. The program to be executed by the CPU or the like may be stored in, for example, the memory 11, may be acquired from a recording medium, such as a detachable external semiconductor memory or the like (not illustrated), or may be acquired via a network or the like (not illustrated).

In step S301 illustrated in FIG. 4A, the correction setting circuit 4 sets the light-free area at the image height or higher in the area outside the image circle where no light reaches, under control of the control circuit 10. The image height setting processing in step S301 will be described in detail below.

In step S302, the correction setting circuit 4 sets a correction value to be used in a case where the correction circuit 51 performs correction processing according to lens optical characteristics under control of the control circuit 10. The correction value processing in step S302 will be described in detail below.

In step S303, the correction circuit 51 performs correction processing in which the deterioration in the image quality due to the characteristics of the lens unit 1 is reduced by image signal processing using the correction value set by the correction setting circuit under control of the control circuit 10.

FIG. 4B is a flowchart illustrating a detailed processing procedure of the image height setting processing in step S301 illustrated in FIG. 4A. The processing in the flowchart of FIG. 4B is executed by the control circuit 10 and by the correction setting circuit 4 under control of the control circuit 10.

According to the present exemplary embodiment, a description will be given of a case in which the image height in the area outside the image circle where no light reaches is set while the lens unit 1 is set to the wide-angle side focal length with the aperture wide open and image data is obtained by displaying, for example, an object with a uniform brightness on the entire screen. Further, according to the present exemplary embodiment, image height areas for each pixel width are set as the predetermined image height width in order in the image height direction by the area information supplied to the acquisition circuit 201 from the control circuit 10 described above. The acquisition circuit 201 thus obtains the pixel values corresponding to two image height areas, respectively, in order in the image height direction, and outputs the pair of the pixel values corresponding to the two image height areas to the differential circuit 202.

In step S401 illustrated in FIG. 4B, the control circuit 10 sets an initial value of an image height i to the image height setting circuit 204 of the correction setting circuit 4. According to the present exemplary embodiment, for example, a value indicating the size of the image circle described in the lens characteristic information, specifically, a value of 13.4 mm corresponding to the radius of the image circle in the lens unit 1, is set as the initial value of the image height i.

In step S402, the control circuit 10 sets a maximum sensor image height s to the image height setting circuit 204. According to the present exemplary embodiment, the maximum sensor image height s corresponds to the length in the diagonal direction from the center of the size of an image capturing screen of the image sensor 2 which is a 35 mm full-size sensor. Specifically, a value of 21.6 mm is set as the maximum sensor image height s.

In step S403, the control circuit 10 compares the image height i with the maximum sensor image height s, and determines whether the image height i is higher than that at the image center (image height is 0) and is less than the maximum sensor image height s ($0<i<s$). If the control circuit 10 determines that the image height i is less than the maximum sensor image height s ($0<i<s$) (YES in step S403), the processing proceeds to step S405. When the image height i is set to the initial value, the image height i is smaller than the maximum sensor image height s, and thus the processing proceeds to step S405. On the other hand, if the control circuit 10 determines that the image height i is higher than or equal to the maximum sensor image height s in step S403 (NO in step S403), the processing proceeds to step S404 to be described below.

In S405, the acquisition circuit 201 of the correction setting circuit 4 acquires image data in the image height area at an image height i', which is higher than the image height i, from the image data received from the A/D converter 3 based on the area information supplied from the control circuit 10. In this processing, the acquisition circuit 201 sets the image height i and a target quadrant determined based on the image center using the area information supplied from the control circuit 10. According to the present exemplary embodiment, for example, a fourth quadrant located at a lower right position on the screen, is set as the initial value of the target quadrant.

FIGS. 5A to 5F are diagrams illustrating the relationship between a pixel value at each image height and an image captured in a case where the lens unit 1 is set to the wide-angle side focal length with the aperture wide open.

Figure 5A:
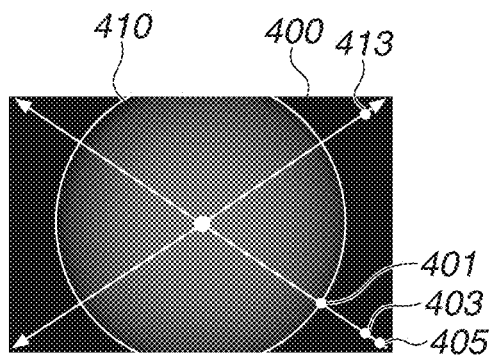
FIGS. 5A and 5D are diagrams illustrating examples of an image indicating a drop in peripheral illumination.

FIG. 5A is a diagram illustrating an example of a captured image 400 captured by the image sensor 2 in a state where the lens unit 1 is set to the wide-angle side focal length with the aperture wide open. The captured image 400 illustrated in FIG. 5A is an example of the captured image of a case where, for example, an image of an object with a uniform brightness is displayed on the entire screen while the lens unit 1 is set to the wide-angle side focal length with the aperture wide open. Like in the example of FIG. 3A, FIG. 5A also illustrates a virtual circle representing an image circle 410 and virtual straight lines extending in the diagonal direction from the optical axis (screen center).

Figure 5D:
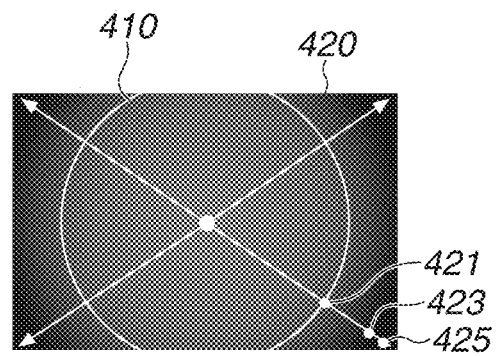
Figure 5B:
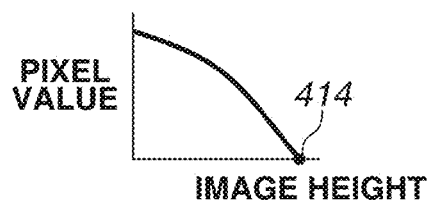
FIGS. 5B, 5C, 5E, and 5F are graphs each illustrating a value of a pixel at each image height.
Figure 5E:
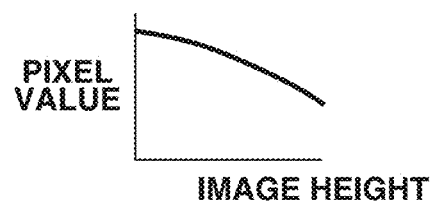
Figure 5C:
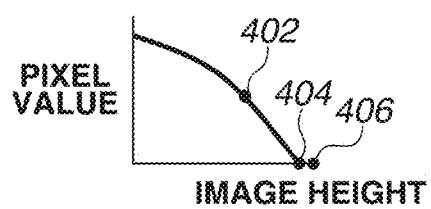

FIG. 5C is a graph in which pixel values are plotted in order in the image height direction from the image center of the captured image 400 illustrated in FIG. 5A to an image end in the fourth quadrant. In step S405, the acquisition circuit 201 acquires a pair of pieces of data corresponding to the pixel values at the set image height i and the image height i', which is higher than the image height i by a predetermined height, on the virtual straight lines from the image center of the captured image 400 to the image end in the fourth quadrant based on the area information supplied from the control circuit 10. In the case of FIGS. 5A and 5C, the acquisition circuit 201 acquires a pixel value 402 at a coordinate 401 of an intersection with the image circle 410 on the virtual straight line from the image center of the captured image 400 to the image end in the fourth quadrant. Further, the acquisition circuit 201 acquires a pixel value 404 at a coordinate 403 at the image height i' which is higher than the image height i. The image height i set to the initial value is 13.4 mm corresponding to the radius of the image circle as described above. On the other hand, the image height i' which is higher than the image height i is set to, for example, 18.4 mm.

In a case where a general lens is set to the wide-angle side focal length with the aperture wide open, the lens shows such lens characteristics that the quantity of incident light rapidly decreases in the vicinity of the image circle. The lens unit 1 also shows such lens characteristics that the quantity of incident light rapidly decreases in the vicinity of the image circle while the lens unit 1 is set to the wide-angle side focal length with the aperture wide open. Accordingly, if the quantity of light at the coordinate 401 on the image circle 410 is already decreasing and the pixel value at the image center is a value of "128" which corresponds to a proper exposure, the pixel value 402 on the image circle 410 decreases to about a value of "64" which is about half the value of 128. Meanwhile, the quantity of light may be substantially "0" at the coordinate 403 which is further spaced apart from the image circle 410 in the image height direction. The acquisition circuit 201 outputs, to the differential circuit 202, data on the pair of the pixel value 402 at the coordinate 401 illustrated in FIG. 5A and the pixel value 404 at the coordinate 403. Then, the processing in the correction setting circuit 4 proceeds to step S406.

In step S406, the differential circuit 202 obtains the absolute value of the difference between the pixel value 402 and the pixel value 404 from the data on the pair of the pixel value 402 and the pixel value 404 sent from the acquisition circuit 201. Specifically, when the pixel value 402 is represented by a value x and the pixel value 404 is represented by a value y, in step S406, the differential circuit 202 calculates a difference absolute value |x-y|. Like in the example described above, when the value x of the pixel value 402 is "64" and the value y of the pixel value 404 is "0", the difference absolute value |x-y| is "64". Then, the differential circuit 202 outputs the difference absolute value |x-y| to the comparison circuit 203, and the processing in the correction setting circuit 4 proceeds to step S407.

In S407, the comparison circuit 203 compares the difference absolute value |x-y| received from the differential circuit 202 with the threshold prepared in the threshold holding circuit 207 of the memory 11, and determines whether the difference absolute value |x-y| is less than the threshold (|x-y|<threshold). According to the present exemplary embodiment, the threshold is preliminarily set to, for example, a value of 10. Like in the example described above, when the difference absolute value |x-y| is "64", the comparison circuit 203 determines that the difference absolute value |x-y| is not less than the threshold (the difference absolute value is higher than or equal to the threshold). The comparison circuit 203 outputs information indicating the determination result (comparison result) based on the comparison to the image height setting circuit 204.

The image height setting circuit 204 determines whether the image height i is included in the light-free area where no light reaches, based on the determination result. If it is determined that the image height i is included in the area where light reaches, the processing proceeds to step S408. Like in the example described above, when the difference absolute value |x-y| is "64", the determination result indicating that the difference absolute value |x-y| is not less than the threshold is obtained. Then, the image height setting circuit 204 determines that the image height i is included in the area where light reaches, and the processing proceeds to S408. On the other hand, if the image height setting circuit 204 determines that the image height i is included in the light-free area where no light reaches, the image height setting circuit 204 notifies the control circuit 10 of the determination result, and then the processing in the correction setting circuit 4 proceeds to S409 to be described below.

In step S408, the image height setting circuit 204 increments the image height i and updates the image height i in the direction of the image height higher than the image height i that is not incremented. According to the present exemplary embodiment, in the case of incrementing the image height i, for example, an image height that is higher than the image height i, which is not incremented yet, by 5 mm is set. In a case where the image height i, which is not incremented yet, is 13.4 mm, like in the example described above, the incremented image height i is set to 18.4 mm.

After the above described processing, the processing in the correction setting circuit 4 returns to step S403. Thus, in S403 and subsequent steps, processing similar to that described above is carried out using the incremented image height i. More specifically, in step S403, the incremented image height i and the maximum sensor image height s are compared. As a result of the comparison, for example, when the processing proceeds to S405, the pixel value at the image height i and the pixel value at the image height i', which is higher than the image height i, in the fourth quadrant are acquired in the same manner as described above. In a case where the image height i is set to 18.4 mm after incrementing the image height i in S408, the image height i', which is higher than the image height i, is set to, for example, 20.4 mm Thus, according to the present exemplary embodiment, the image height i', which is higher than the image height i, is set to an image height which is higher than the image height i and less than 21.6 mm of the maximum sensor image height s.

Further, in the subsequent step S406, the difference absolute value is calculated from the pair of the pixel values corresponding to the image height i and the image height i', respectively, and in the subsequent step S407, the difference absolute value and the threshold are compared. In the examples illustrated in FIGS. 5A and 5C described above, the acquisition circuit 201 calculates the absolute value of the difference between the pair of the pixel value 404 at the coordinate 403 corresponding to the incremented image height i and a pixel value 406 at a coordinate 405 corresponding to the image height i', which is higher than the image height i, and compares the difference absolute value with the threshold. In the examples illustrated in FIG. 5A and FIG. 5C, the pixel value 404 at the coordinate 403 and the pixel value 406 at the coordinate 405 are "0", and thus the difference absolute value is also "0". Accordingly, in S407, the comparison circuit 203 determines that the difference absolute value is less than the threshold, and sends information about the determination result to the image height setting circuit 204. Further, in a case where the image height setting circuit 204 receives the determination result indicating that the difference absolute value is less than the threshold, the processing proceeds to step S409 to be described below.

In this case, it is considered that the state where the comparison circuit 203 receives the determination result indicating that the difference absolute value is less than the threshold indicates a state where the number of pixel values is not increased or decreased even if the image height is changed even in the area outside the image circle where it is more likely that the peripheral illumination may decrease to a large extent. It is also considered that the above-described state of the image height i is one of a state where light is blocked by a lens barrel or the like of the lens unit 1 and thus does not reach, and a state where a black object is set and thus the quantity of incident light is extremely small. Accordingly, in steps S409 to S411, the correction setting circuit 4 performs processing for determining which one of the states is set.

In step S409, the acquisition circuit 201 acquires image data at the image height i in a plurality of quadrants of the captured image based on the area information supplied from the control circuit 10 from the image data received from the A/D converter 3. Accordingly, the control circuit 10 sets the image height i, the same as the image height i set in the fourth quadrant, in the quadrants other than the fourth quadrant treated in the processing described above among the quadrants based on the image center of the captured image. A description will be given of a case where, for example, the image height i is set in a first quadrant located at an upper right position on the screen.

FIG. 5B is a graph in which pixel values are plotted in order in the image height direction from the image center of the captured image 400 illustrated in FIG. 5A to an image end in the first quadrant. In this case, the control circuit 10 sets a coordinate 413 corresponding to an image height i (e.g., the image height of 18.4 mm) for a case in which it is determined that the difference absolute value is less than the threshold in step S407 as described above on the virtual straight line from the image center of the captured image 400 to the image end in the first quadrant. Accordingly, in step S409, the acquisition circuit 201 acquires a pixel value 414 at the image height i set on the virtual straight line from the image center of the captured image 400 to the image end in the first quadrant by the area information which indicates the coordinate 413 in the first quadrant and is supplied from the control circuit 10. Further, the acquisition circuit 201 outputs the pixel value 414 at the coordinate 413 to the differential circuit 202. In the examples illustrated in FIGS. 5A and 5B, the pixel value 414 at the image height i is "0".

In step S410, the differential circuit 202 obtains the absolute value of the difference between the pixel value 404 acquired at the image height i in the fourth quadrant described above and the pixel value 414 acquired at the image height i in the first quadrant. For example, when the pixel value 404 is represented by a value m and the pixel value 414 is represented by a value n, in step S410, the differential circuit 202 calculates a difference absolute value |m-n|. In this example, as described above, the value m of the pixel value 404 is "0" and the value n of the pixel value 414 is also "0", and thus the absolute value |m-n| of the difference between the pixel values is also "0". Further, the differential circuit 202 outputs the difference absolute value |m-n| to the comparison circuit 203, and the processing in the correction setting circuit 4 proceeds to step S411.

In step S411, the comparison circuit 203 compares the difference absolute value |m-n| received from the differential circuit 202 with the threshold prepared in the threshold holding circuit 207 of the memory 11, and determines whether the difference absolute value |m-n| is less than the threshold (|m-n|<threshold). According to the present exemplary embodiment, the threshold is also preliminarily set to, for example, the value of 10. In the examples described above, since the difference absolute value |m-n| is "0", the comparison circuit 203 determines whether the difference absolute value |m-n| is less than the threshold in S411, and sends the determination result to the image height setting circuit 204.

In response to receipt of the determination result indicating that the difference absolute value |m-n| is less than the threshold, the image height setting circuit 204 recognizes that the number of pixel values is not increased or decreased even if the pixel values at the same image height i in different quadrants, i.e., in the fourth quadrant and the first quadrant, are substantially the same. In this case, the image height setting circuit 204 determines that the area at the image height i is the light-free area where light is blocked by the lens barrel or the like of the lens unit 1 and thus does not reach. In step S412, information indicating that the light-free area has an image height higher than or equal to the image height i is sent to the modification circuit 206. Accordingly, the modification circuit 206 performs processing for modifying the correction value corresponding to the light-free area at an image height higher than or equal to the image height i as described above. The processing in the modification circuit 206 will be described in detail below.

Meanwhile, in step S411, for example, in a case where it is determined that the difference absolute value |m-n| is not less than the threshold, it is considered that a black object may be present in the vicinity of the image circle, or in the area outside the image circle, in the fourth quadrant or the first quadrant. This case will be described in detail below.

In the example described above, the quadrants are set in the directions corresponding to four corners of the image from the image center. However, the disclosure is not limited to this example. For example, more quadrants may be set with an angle from the image center as an origin. The exemplary embodiment described above illustrates an example in which the absolute value of the difference between the pixel values at the same image height i in two quadrants is obtained. However, for example, the pixel values at the same image height i in three or more quadrants may be acquired and the absolute value of the difference between the pixel values may be compared with the threshold, to thereby determine whether the image height i is included in the light-free area.

A description will be given of the image height setting processing to be performed in S301 illustrated in FIG. 4A in a case where the lens unit 1 is set to a telephoto-side focal length with an aperture wide open. Also, in this case, a description will be given of assuming a case where, for example, an image of an object with a uniform brightness is displayed on the entire screen, to facilitate the description of lens characteristics of the lens unit 1 with respect to the quantity of incident light.

Also, in a case where the lens unit 1 is set to the telephoto-side focal length with the aperture wide open, the image height setting processing in step S301 illustrated in FIG. 4A is carried out in substantially the same manner as the processing in the flowchart illustrated in FIG. 4B described above. Accordingly, hereinafter, as the example of a case in which the lens unit 1 is set to the wide-angle side focal length with the aperture wide open as described above, only the processing or the like to be performed if the quantity of incident light, pixel values, difference absolute value, and the like are different from those described above will be described, and descriptions of the other processing are omitted as needed.

Figure 5F:
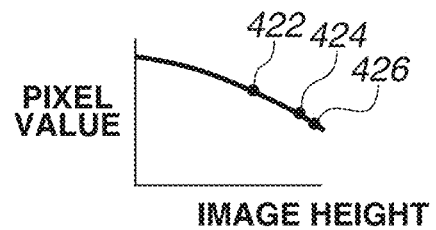

FIGS. 5D to 5F are diagrams illustrating the relationship between the pixel values at each image height and the captured image, assuming a case where the lens unit 1 is set to the telephoto-side focal length with the aperture wide open.

FIG. 5D illustrates an example of a captured image 420 captured by the image sensor 2 in a state where the lens unit 1 is set to the telephoto-side focal length with the aperture wide open. The captured image 420 illustrated in FIG. 5D is an example of an image captured in such a manner that an image of an object with a uniform brightness is displayed on the entire screen, like in the example of FIG. 5A. FIG. 5D also illustrates a virtual circle representing the image circle 410 and virtual straight lines extending in the diagonal direction from the screen center in the same manner as described above.

FIG. 5F is a graph in which pixel values are plotted in order in the image height direction from the image center of the captured image 420 illustrated in FIG. 5D to the image end in the fourth quadrant. In step S405, in the same manner as described above, the acquisition circuit 201 acquires a pair of pieces of data on the pixel values corresponding to the image height i and the image height i', respectively, set on the virtual straight line from the image center of the captured image 420 illustrated in FIG. 5D to the image end in the fourth quadrant. In the case of FIGS. 5D and 5F, the acquisition circuit 201 acquires a pixel value 422 at a coordinate 421 of an intersection with the image circle 410 on the virtual straight line from the image center of the captured image 420 to the image end in the fourth quadrant, and further acquires a pixel value 424 at a coordinate 423 at the image height i'.

In this case, in a case where general lenses are set to the telephoto-side focal length with the aperture wide open, many of the lenses show such lens characteristics that a rapid decrease in the quantity of incident light rarely occurs in the vicinity of the image circle and the quantity of incident light decreases moderately even at a high image height in the area outside the image circle. According to the present exemplary embodiment, the lens unit 1 also has such lens characteristics that a decrease in the quantity of incident light rarely occurs even at a high image height in the vicinity of the image circle, or in the area outside the image circle, in a case where the lens unit 1 is set to the telephoto-side focal length with the aperture wide open. Accordingly, a decrease in the quantity of light at the coordinate 421 on the image circle 410 is small and the pixel value at the image center is "128" corresponding to the proper exposure, the pixel value 422 on the image circle 410 is maintained at about "96" which is about ¾ of the value "128". Also, at the coordinate 423, which is further spaced apart from the image circle 410 in the image height direction, the light quantity is not "0". For example, assume that the pixel value is about "64" which is about half the light quantity (128) at the image center.

In step S405, the acquisition circuit 201 outputs, to the differential circuit 202, a pair of the pixel value 422 at the coordinate 421 and the pixel value 424 at the coordinate 423. Further, in S406, the differential circuit 202 obtains the absolute value |x-y| of the difference between the pixel value 422 and the pixel value 424. In this example, since the value x of the pixel value 422 is "96" and the value y of the pixel value 424 is "64", the difference absolute value |x-y| is "32".

In step S407, the comparison circuit 203 compares the difference absolute value |x-y| with the threshold. In this example, since the difference absolute value |x-y| is "32", which is higher than the threshold "10", the comparison circuit 203 determines that the difference absolute value |x-y| is not less than the threshold (the difference absolute value is higher than or equal to the threshold). Based on the determination result, the image height setting circuit 204 determines that the image height i is included in the area where light reaches, and in the subsequent step S408, the image height i is incremented.

When the processing returns to step S403 from step S408, processing similar to that described above is carried out using the incremented image height i in step S403 and subsequent steps. After that, the processing proceeds to step S406, and the difference absolute value is calculated based on the pair of the pixel values corresponding to the incremented image height i (18.4 mm) and the image height i' (21.6 mm), respectively, and then in step S407, the difference absolute value is compared with the threshold. In the examples of FIGS. 5D and 5F described above, the acquisition circuit 201 calculates the absolute value of the difference between the pixel value 424 at the coordinate 423 corresponding to the incremented image height i and a pixel value 426 at a coordinate 425 corresponding to the image height i', and the calculated difference absolute value is compared with the threshold. In this example, the quantity of incident light has not reached "0" at the coordinate 425 of the image height i', and the absolute value of the difference between the pixel value 424 and the pixel value 426 is higher than the threshold. Accordingly, in step S407, it is determined that the difference absolute value is not less than the threshold, and in step S408, the image height i is incremented. In this case, the image height i which is not incremented yet is 18.4 mm, and thus the incremented image height i that is increased by 5 mm is 21.6 mm.

When the processing returns to step S403 after step S408, the control circuit 10 compares the image height i with the maximum sensor image height s. However, in this case, the image height i is 21.6 mm as described above, and thus the image height i has the same value as the maximum sensor image height s of 21.6 mm. Accordingly, in step S403, the control circuit 10 determines that the image height i is higher than or equal to the maximum sensor image height s, and then the processing proceeds to step S404.

In step S404, the control circuit 10 controls the image height setting circuit 204 to set the value of the maximum sensor image height s to the image height i, and then the processing proceeds to step S412. In S412, the image height setting circuit 204 outputs information indicating the image height i set to the value of the maximum sensor image height s to the modification circuit 206. In this case, the modification circuit 206 outputs the correction value, which is calculated by the calculation circuit 205 described above, without modifying the calculated correction value, because the light-free area is not present in the area up to the maximum sensor image height s.

FIG. 5E is a graph in which pixel values are plotted in order in the image height direction from the image center of the captured image 420 illustrated in FIG. 5D to the image end in a quadrant (e.g., the first quadrant) other than the fourth quadrant. However, in this example, the processing does not proceed to S409 and subsequent steps in FIG. 4B, and thus the description with reference to FIG. 5E is omitted.

A description will be given of the image height setting processing which is performed in S301 illustrated in FIG. 4A in a case where, for example, an image of a black object is included in the captured image while image capturing is performed in a state where the lens unit 1 is set to the telephoto-side focal length with the aperture wide open. Also, in this case, an example in which, for example, an image of an object with a uniform brightness is displayed on the entire screen is described to facilitate the description of the lens characteristics of the lens unit 1 with respect to the quantity of incident light. However, an image of a black object is included in the captured image.

Also, in this case, the image height setting processing to be performed in step S301 illustrated in FIG. 4A is carried out in substantially the same manner as the processing in the flowchart of FIG. 4B described above. After that, in a case where an image of a black object is captured in the example in which the lens unit 1 is set to the wide-angle side focal length with the aperture wide open as described above, only the processing or the like to be performed if the quantity of incident light, pixel values, difference absolute value, and the like are different from those described above will be described, and descriptions of the other processing are omitted as needed.

Figure 6A:
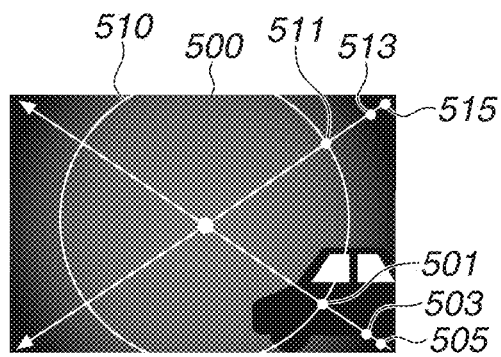
FIG. 6A is a diagram illustrating an example of an image which has a black object therein and has a drop in peripheral illumination.
Figure 6B:
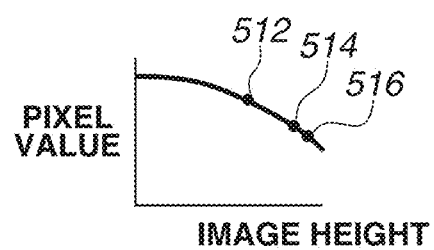
FIGS. 6B and 6C are graphs each illustrating a value of a pixel at each image height.
Figure 6C:
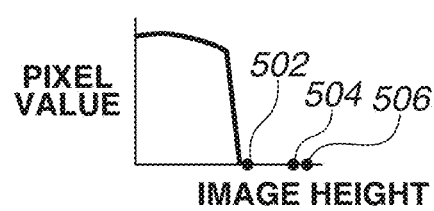

FIGS. 6A to 6C are diagrams illustrating the relationship between the pixel values at each image height and the captured image, in a case where the lens unit 1 is set to the telephoto-side focal length with the aperture wide open, and an image of a black object is captured, for example, in the vicinity of the image circle, or in the area outside the image circle.

FIG. 6A illustrates an example of a captured image 500, in a case where image capturing is performed by the image sensor 2 in a state where the lens unit 1 is set to the telephoto-side focal length with the aperture wide open. The captured image 500 illustrated in FIG. 6A is captured in a case where an image of an object with a uniform brightness is displayed on the entire screen, like in the example of FIG. 5A. However, in the example of the captured image 500 illustrated in FIG. 6A, a black object (e.g., an automobile) is present in the fourth quadrant of the captured image 500 and the image of the black object is captured in an area from the vicinity of an image circle 510 to the image end in the fourth quadrant. FIG. 6A also illustrates a virtual circle representing the image circle 510 and virtual straight lines extending in the diagonal direction from the screen center in the same manner as described above.

FIG. 6C is a graph in which pixel values are plotted in order in the image height direction from the image center of the captured image 500 illustrated in FIG. 6A to the image end in the fourth quadrant. In step S405, the acquisition circuit 201 acquires, as a pair of data, the data on the pixel values corresponding to the set image height i and the image height i', respectively, on the virtual straight line from the image center of the captured image 500 illustrated in FIG. 6A to the image end in the fourth quadrant in the same manner as described above. In this example, the acquisition circuit 201 acquires a pixel value 502 at a coordinate 501 of an intersection with the image circle 510 on the virtual straight line from the image center of the captured image 500 to the image end in the fourth quadrant, and further acquires a pixel value 504 at a coordinate 503 at the image height i'.

In this case, in a case where the lens unit 1 is set to the telephoto-side focal length with the aperture wide open, a rapid decrease in the quantity of incident light rarely occurs in the vicinity of the image circle as described above, and the quantity of incident light decreases moderately even at a high image height in the area outside the image circle in many cases. However, in this example, the image of the black object is captured in the area from the vicinity of the image circle 510 in the fourth quadrant of the captured image 500 to the image end. Also, assume that the pixel values of pixels included in the black object, i.e., the quantity of incident light at the image height corresponding to each of the pixels is set to an extremely low value (e.g., "0"). Therefore, the pixel value 502 at the coordinate 501 on the image circle 510, and pixel values 504 and 506 at coordinates 503 and 505, respectively, at the image height higher than the coordinate 501 of the pixel value 502 are "0".

In this example, since the pair of the pixel value 502 at the coordinate 501 and the pixel value 504 at the coordinate 503, which are acquired by the acquisition circuit 201 in step S405, is "0", in step S406, the difference absolute value |x-y| calculated by the differential circuit 202 is also "0". Accordingly, in step S407, the comparison circuit 203 determines that the difference absolute value |x-y| is less than the threshold, and the processing in the correction setting circuit 4 proceeds to step S409. Specifically, since the difference absolute value |x-y| is less than the threshold in one of the state where light is blocked by the lens barrel or the like and the state where an image of a black object is captured, as described above, the processing proceeds to step S409 and subsequent steps to determine a state from either one of the states.

In step S409, the acquisition circuit 201 acquires image data at the image height i in a plurality of quadrants of the captured image under control of the control circuit 10. Also, in this case, in the same manner as described above, the control circuit 10 sets the coordinate corresponding to the image height i of a case in which it is determined that the difference absolute value is less than the threshold in the fourth quadrant on the straight line from the image center of the captured image 500 to the image end in the first quadrant. In this example, the image height i set in a case where it is determined that the difference absolute value is less than the threshold in S407 is the image height set to the initial value. Thus, the control circuit 10 sets a coordinate 511 corresponding to the image height i at an intersection with the image circle 510 on the straight line from the image center to the image end in the first quadrant, and the acquisition circuit 201 acquires the pixel value at the coordinate 511.

FIG. 6B is a graph in which pixel values are plotted in order in the image height direction from the image center of the captured image 500 illustrated in FIG. 6A to the image end in the first quadrant. In this case, in the example of FIG. 6A, the image of the black object is included only in the fourth quadrant of the captured image 500, and the image of the black object is not included in the first quadrant. Accordingly, the graph of FIG. 6B in which pixel values are plotted in the first quadrant is similar to the graph of FIG. 5F in the fourth quadrant of the captured image 420 illustrated in FIG. 5D described above. Thus, as described above, a pixel value 512 at the coordinate 511 at the image height of 13.4 mm in the first quadrant is, for example, "96", a pixel value 514 at a coordinate 513 at the image height of 18.4 mm is "64", and a pixel value 516 at a coordinate 515 at the image height of 20.4 mm is a large value to some extent.

Further, when the processing proceeds to step S410 from step S409, in the same manner as described above, the differential circuit 202 obtains the absolute value |m-n| of the difference between the pixel value 502 acquired at the image height i in the fourth quadrant and the pixel value 512 acquired at the image height i in the first quadrant. In this case, the pixel value 502 acquired at the image height i in the fourth quadrant is "0", while the pixel value 512 acquired at the image height i in the first quadrant is, for example, "96". Therefore, the absolute value |m-n| of the difference between the pixel values is "96".

In S411, as described above, the comparison circuit 203 compares the difference absolute value |m-n| with the threshold, and determines whether the difference absolute value |m-n| is less than the threshold (|m-n|<threshold). In this example, the difference absolute value |m-n| is "96" and the threshold is "10". Accordingly, in S411, the comparison circuit 203 determines that the difference absolute value |m-n| is not less than the threshold (higher than or equal to the threshold), and the determination result is sent to the image height setting circuit 204.

In a case where the image height setting circuit 204 receives the determination result indicating that the difference absolute value |m-n| is not less than the threshold, the image height setting circuit 204 determines that the pixel values at the same image height i in the plurality of quadrants, i.e., in the fourth quadrant and the first quadrant, are not the same, or are significantly different from each other. In this case, the image height setting circuit 204 determines that light reaches the image height i in the first quadrant, and the processing proceeds to step S408. Then, the image height setting circuit 204 increments the image height i in the first quadrant in the same manner as described above.

After that, the processing in the correction setting circuit 4 returns to S403, and the processing in S403 and subsequent steps is performed on the first quadrant. More specifically, the processing in step S403 and subsequent steps is performed on the first quadrant in the same manner as described above. In the first quadrant illustrated in FIG. 6A, the light-free area is not present in the area up to the image height at the image end, and thus the processing returning from step S403 to step S407 and the processing returning from step S408 to step S403 are carried out. Lastly, in the first quadrant, it is determined that the image height i is higher than or equal to the maximum sensor image height s in step S403 and the processing proceeds to step S404, and then the processing proceeds to step S412.

Then, in step S412, the image height setting circuit 204 outputs information indicating the image height i set to the value of the maximum sensor image height s to the modification circuit 206. Thus, since the light-free area is not present in the area up to the maximum sensor image height s, the modification circuit 206 outputs the correction value, which is calculated by the calculation circuit 205 described above, without modifying the correction value. More specifically, in a case where an image of a black object is included in the captured image obtained in a state where the lens unit 1 is set to the telephoto-side focal length with the aperture wide open, modification processing for modifying the correction value that is performed if the light-free area due to vignetting of the lens barrel or the like is present is not carried out.

FIG. 4C is a flowchart illustrating a detailed processing procedure of the correction value control processing in step S302 illustrated in FIG. 4A. The processing in the flowchart of FIG. 4C is executed by the control circuit 10 and by the modification circuit 206 under control of the control circuit 10.

In step S501 illustrated in FIG. 4C, the modification circuit 206 acquires information indicating the image height i set as described above by the image height setting circuit 204.

In step S502, the modification circuit 206 acquires information about a maximum lens height d from the control circuit 10 via the calculation circuit 205. The maximum lens image height d is information acquired from the lens characteristic information read from the memory 104 of the lens unit 1 by the control circuit 10. As described above, according to the present exemplary embodiment, in a case where the lens characteristic information about the lens unit 1 is available only for the area within the image circle and information on the outside of the image circuit is not available, the maximum lens image height d is the image height corresponding to the radius of the image circle.

In step S503, the modification circuit 206 compares the image height i with the maximum lens image height d, and determines whether the image height i is higher than the maximum lens image height d. In this processing, modification of the correction value for the image height where the lens characteristic information is present is not necessary. Thus, in a case where the modification circuit 206 determines that the image height i is less than or equal to the maximum lens image height d (NO in step S503), the processing proceeds to step S504 to set the value of the maximum lens image height d to the image height i. After step S504, the processing proceeds to step S505. Meanwhile, modification of the correction value for the image height where the lens characteristic information is not present is necessary. Thus, in a case where the modification circuit 206 determines that the image height i is higher than the maximum lens image height d (d<i) (YES in step S503), the processing proceeds to S505.

In step S505, the modification circuit 206 acquires correction data for correcting a drop in peripheral illumination that is calculated as described above by the calculation circuit 205. According to the present exemplary embodiment, in step S505, the modification circuit 206 acquires the correction data 603 as illustrated in FIG. 3C described above.

In step S506, the modification circuit 206 modifies only the correction value corresponding to an image height higher than the image height i among the correction data 603 as described above. According to the present exemplary embodiment, the modification circuit 206 modifies the correction value in such a manner that the average change ratio corresponding to the image height of the correction value in the light-free area at an image height higher than the image height i becomes smaller than the average change ratio corresponding to the image height of the correction value in an area at an image height smaller than the image height i. For example, the modification circuit 206 modifies the correction value for the light-free area at an image height higher than or equal to the image height i in such a manner that the correction value is clipped using the correction value corresponding to the image height i as illustrated in FIG. 3D. The correction data including the modified correction value is output from the correction setting circuit 4 and is sent to the correction circuit 51 of the development circuit 5 illustrated in FIG. 1. After the processing in S506, the processing in the correction setting circuit 4 proceeds to S303 illustrated in FIG. 4A described above.

As described above, the camera 100 according to the present exemplary embodiment sets the image height in the area outside the image circle where no light reaches, and sets the average change ratio corresponding to the image height of the correction value at an image height higher than the set image height to be smaller than that at an image height smaller than the set image height. Consequently, it is possible to suppress side effects caused by the lens optical correction, such as an increase in noise or color curving, on the area outside the image circle where no light reaches, while obtaining the effect of correction on the area outside the image circle where light reaches.

According to the exemplary embodiments described above, the APS-C lens is mounted on the lens-interchangeable camera including the 35 mm full-size image sensor, the image processing according to the present exemplary embodiment is also applicable to, for example, a camera having a circular fisheye lens mounted thereon. In a case where the circular fisheye lens is mounted on a camera, on the imaging plane of the image sensor, an area where no light reaches and an object image or the like is not formed is present at an image height higher than that of the image circle of the circular fisheye lens. Accordingly, even in a case where the circular fisheye lens is mounted, the area outside the image circle where no light reaches is set, and the average change ratio corresponding to the image height of the correction value in the area higher than the set area in the image height direction is set to be smaller than that in the area at an image height smaller than that in the set area, in the same manner as described above. Consequently, it is possible to suppress side effects of the lens optical correction on the vicinity of the area where no light reaches, while obtaining the effect of correction on the area outside the image circle where light reaches, even in a case where the circular fisheye lens is mounted.

<Examples of Correction Value Setting Processing for Diffraction Correction>

While, in the above description, the correction value setting processing for correcting a drop in peripheral illumination has been taken as an example, correction value setting processing for image diffraction correction will be described below as another example of the correction value setting processing. In a case where diffraction correction is performed, the correction setting circuit 4 illustrated in FIGS. 1 and 2 performs processing for setting the correction value for diffraction correction. Then, the correction circuit 51 of the development circuit 5 performs image processing for correcting the deterioration in the image quality due to a diffraction phenomenon on a digital image signal (image data) received from the A/D converter 3, by using the correction value for diffraction correction set by the correction setting circuit 4.

The correction value setting processing for diffraction correction according to the present exemplary embodiment will be described in detail below.

In the camera 100, when the power supply is turned on, or when the interchangeable lens (lens unit 1) is connected, the control circuit 10 reads the lens characteristic information about the lens unit 1 from the memory 104 in the same manner as described above. In this processing, the lens characteristic information includes information about a diffraction correction filter. Further, in the same manner as described above, the control circuit 10 acquires lens state information indicating the current state of the lens unit 1 at a predetermined timing (e.g., for each frame). Then, the control circuit 10 notifies the correction setting circuit 4 illustrated in FIG. 2 of the lens characteristic information and the lens state information.

The processing to be performed by the acquisition circuit 201, the differential circuit 202, the comparison circuit 203, and the image height setting circuit 204 of the correction setting circuit 4 is similar to that described above, and the value of the image height i, which is set in the manner as described above, is sent to the modification circuit 206 from the image height setting circuit 204.

The calculation circuit 205 performs correction value calculation processing for converting the information about the diffraction correction filter included in the lens characteristic information into a diffraction correction coefficient corresponding to an aperture value for image capturing which is included in the lens state information. Further, the calculation circuit 205 generates the diffraction correction coefficient in the area outside the image circle by interpolation processing. Then, the diffraction correction coefficient calculated by the calculation circuit 205 is sent to the modification circuit 206 as correction data.

In the case of diffraction correction processing, the overall processing procedure as described above is also similar to that of the flowchart of FIG. 4A described above, and the processing procedure of the image height setting processing is also similar to that of the flowchart of FIG. 4B described above. In the correction value control processing in the flowchart of FIG. 4C, the processing from steps S501 to S504 is similar to that described above, but the processing in step S505 and subsequent steps is partially different from the processing described above.

In the diffraction correction processing, when the processing proceeds to the correction value control processing in step S505 illustrated in FIG. 4C, the modification circuit 206 acquires the correction data including the diffraction correction coefficient obtained by converting the diffraction correction filter corresponding to the aperture value for image capturing by the calculation circuit 205.

In step S506, the modification circuit 206 modifies, based on the image height i set by the image height setting circuit 204, the diffraction correction coefficient generated as described above by the calculation circuit 205. Specifically, the modification circuit 206 modifies the diffraction correction coefficient in such a manner that the average change ratio corresponding to the image height of the correction value becomes smaller than that at an image height higher than the image height i which is notified from the image height setting circuit 204. In the case of modifying the diffraction correction coefficient, the modification processing in which the diffraction correction coefficient at an image height higher than or equal to the image height i is clipped may be also performed. Further, the modified diffraction correction coefficient is output from the correction setting circuit 4 and is sent to the correction circuit 51 of the development circuit 5 illustrated in FIG. 1. After the processing in step S506, the processing in the correction setting circuit 4 proceeds to step S303 illustrated in FIG. 4A described above. Accordingly, in step S303, the correction circuit 51 performs diffraction correction processing to reduce the deterioration in the image quality due to a diffraction phenomenon by image signal processing.

As described above, in the case of performing the diffraction correction processing, the image height in the area outside the image circuit where no light reaches is also set and the diffraction correction coefficient is modified in such a manner that the amount of diffraction correction at an image height higher than the set image height becomes smaller than that at an image height smaller than the set image height, in the same manner as described above. Consequently, it is possible to suppress side effects of diffraction correction on the vicinity of the area where no light reaches, while obtaining the effect of correction on the area where light reaches.

The disclosure is applicable to any processing using correction data that is changed in a manner corresponding to the image height. For example, the disclosure is also applicable to chromatic aberration correction processing to correct the amount of positional deviation of the pixel corresponding to R or B from the image-forming position of the pixel corresponding to G in a camera including an image sensor having an RGB Bayer array. In this case, the calculation circuit 205 calculates the amount of positional deviation of the pixel corresponding to R or B from the image-forming position of the pixel corresponding to G, and outputs the amount of positional deviation to the modification circuit 206. Further, the modification circuit 206 performs modification processing to reduce the amount of positional deviation on an image height higher than the image height i sent from the image height setting circuit 204.

In the exemplary embodiments described above, a lens-interchangeable digital camera is illustrated by way of example. However, the present exemplary embodiment is not limited to this example, and can also be applied to other image capturing apparatuses. For example, the present exemplary embodiment is applicable not only to a digital camera, but also to various mobile terminals, such as a smartphone and a tablet terminal, which include a camera function, various monitoring cameras, industrial cameras, in-vehicle cameras, and medical cameras.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-062074, filed Mar. 28, 2018, which is hereby incorporated by reference herein in its entirety.

What is claimed is:
1. An image processing apparatus including circuitry configured to:
set a correction value for correcting a deterioration in an image quality due to characteristics of an image optical system, based on characteristic information about the image optical system; and
perform image processing using the correction value on an image captured by the image optical system,
wherein a degree of the deterioration in the image quality due to the characteristics of the image optical system changes in a manner corresponding to an image height,
wherein (i) an average of change ratios in the correction value to a change in the image height in a first area is smaller than an average of change ratios in the correction value to a change in the image height in a second area, or (ii) the correction value in the first area is constant and the correction value in the second area changes in a manner corresponding to the image height,
wherein the first area is an area corresponding to a range outside an image circle where an object image based on incident light having passed through the image optical system is not present, and the second area is an area corresponding to a range within the image circle where the object image based on the incident light having passed through the image optical system is present,
wherein the circuitry sets the first area by analyzing the image, and
wherein the circuitry compares a predetermined threshold with a difference between image signals at a plurality of image heights of the image, and sets an area as the first area, the area corresponding to an image height at which the difference is less than the predetermined threshold.
2. The image processing apparatus according to claim 1, wherein the circuitry sets at least two quadrants to the image by setting a center of the image as an origin, wherein even in a case where the difference between the image signals in one of the at least two quadrants is less than the predetermined threshold, an area corresponding to an image height at which the difference between the image signals is not less than the predetermined threshold in the other one of the quadrants is not set as the first area, and wherein an area corresponding to an image height where the difference between the image signals is less than the predetermined threshold in all of the at least two quadrants is set as the first area.

3. The image processing apparatus according to claim 1, wherein the characteristic information is information corresponding only to an image height less than or equal to a predetermined image height.

4. The image processing apparatus according to claim 3, wherein the circuitry generates correction values for an area at an image height higher than the predetermined image height by interpolation, based on the characteristic information.

5. The image processing apparatus according to claim 4, wherein the circuitry sets limit to a level for only a correction value corresponding to the first area among the correction values generated by the interpolation.

6. The image processing apparatus according to claim 1, wherein the image optical system includes an interchangeable lens.

7. The image processing apparatus according to claim 6, wherein the correction value is used for correcting a deterioration in an image quality due to at least one of a drop in peripheral illumination, an aberration, and a diffraction.

8. An image processing method comprising:
setting a correction value for correcting a deterioration in an image quality due to characteristics of an image optical system, based on characteristic information about the image optical system; and
performing image processing using the correction value on an image captured by the image optical system,
wherein a degree of the deterioration in the image quality due to the characteristics of the image optical system changes in a manner corresponding to an image height,
wherein (i) an average of change ratios in the correction value to a change in the image height in a first area is smaller than an average of change ratios in the correction value to a change in the image height in a second area, or (ii) the correction value in the first area is constant and the correction value in the second area changes in a manner corresponding to the image height, wherein the first area is an area corresponding to a range outside an image circle where an object image based on incident light having passed through the image optical system is not present, and the second area is an area corresponding to a range within the image circle where the an object image based on the incident light having passed through the image optical system is present, and wherein the method further comprising:
setting the first area by analyzing the image, and
comparing a predetermined threshold with a difference between image signals at a plurality of image heights of the image, and setting an area as the first area, the area corresponding to an image height at which the difference is less than the predetermined threshold.

9. A non-transitory computer-readable storage medium having stored thereon a program that, when executed by a computer, causes the computer to:
set a correction value for correcting a deterioration in an image quality due to characteristics of an image optical system, based on characteristic information about the image optical system; and
perform image processing using the correction value on an image captured by the image optical system,
wherein a degree of the deterioration in the image quality due to the characteristics of the image optical system changes in a manner corresponding to an image height,
wherein (i) an average of change ratios in the correction value to a change in the image height in a first area is smaller than an average of change ratios in the correction value to a change in the image height in a second area, or (ii) the correction value in the first area is constant and the correction value in the second area changes in a manner corresponding to the image height,
wherein the first area is an area corresponding to a range outside an image circle where an object image based on incident light having passed through the image optical system is not present, and the second area is an area corresponding to a range within the image circle where the object image based on the incident light having passed through the image optical system is present, and
wherein the program further causes the computer to:
set the first area by analyzing the image, and
compare a predetermined threshold with a difference between image signals at a plurality of image heights of the image, and set an area as the first area, the area corresponding to an image height at which the difference is less than the predetermined threshold.

\* \* \* \* \*